(12) United States Patent
Sugimura et al.

(10) Patent No.: US 10,840,600 B2
(45) Date of Patent: Nov. 17, 2020

(54) RF TAG

(71) Applicant: PHOENIX SOLUTION CO., LTD., Kanazawa (JP)

(72) Inventors: Shiro Sugimura, Kanazawa (JP); Tatsuji Niwata, Kanazawa (JP); Hayato Nabeshima, Kanazawa (JP)

(73) Assignee: PHOENIX SOLUTION CO., LTD., Ishikawa (JP)

( * ) Notice: Subject to any disclaimer, the term of this patent is extended or adjusted under 35 U.S.C. 154(b) by 211 days.

(21) Appl. No.: 16/082,040

(22) PCT Filed: Mar. 2, 2017

(86) PCT No.: PCT/JP2017/008217
§ 371 (c)(1),
(2) Date: Sep. 4, 2018

(87) PCT Pub. No.: WO2017/150648
PCT Pub. Date: Sep. 8, 2017

(65) Prior Publication Data
US 2020/0287289 A1    Sep. 10, 2020

(30) Foreign Application Priority Data
Mar. 3, 2016 (JP) ................. 2016-040743

(51) Int. Cl.
*H01Q 9/30* (2006.01)
*A01K 11/00* (2006.01)
(Continued)

(52) U.S. Cl.
CPC ............. *H01Q 9/30* (2013.01); *A01K 11/006* (2013.01); *G06K 19/07788* (2013.01); *H01Q 1/36* (2013.01); *H01Q 1/42* (2013.01)

(58) Field of Classification Search
None
See application file for complete search history.

(56) References Cited

FOREIGN PATENT DOCUMENTS

| JP | 2003-226434 A | 8/2003 |
| JP | 2006-039991 A | 2/2006 |

(Continued)

OTHER PUBLICATIONS

International Search Report for PCT/JP2017/008217 dated Apr. 11, 2017.

*Primary Examiner* — Kristy A Haupt
(74) *Attorney, Agent, or Firm* — Pearne & Gordon LLP

(57) ABSTRACT

There is provided an RF tag that can be mounted in a cavity of a member formed of a conductor having the cavity therein, and has high communication performance. An RF tag 1 of the present invention is an RF tag that is mounted in a cavity 101 of a conductor-made member 100 having the cavity 101 therein, and includes at least a free space antenna 10, a resonance circuit 20, an IC chip 30, a closed space antenna 40, and a substrate 50 for supporting the closed space antenna, a portion of the free space antenna is exposed from the cavity to the outside, and the substrate supports the closed space antenna so that the closed space antenna is not in contact with the inner surface of the conductor-made member. The closed space antenna, the substrate and the conductor-made member forms a capacitor portion C2.

5 Claims, 3 Drawing Sheets

(51) Int. Cl.
　　　*G06K 19/077*　　　(2006.01)
　　　*H01Q 1/36*　　　(2006.01)
　　　*H01Q 1/42*　　　(2006.01)

(56) References Cited

FOREIGN PATENT DOCUMENTS

| | | |
|---|---|---|
| JP | 2008-181557 A | 8/2008 |
| JP | 2010-185809 A | 8/2010 |
| JP | 2015-225579 A | 12/2015 |
| JP | 2017058815 A * | 3/2017 |

* cited by examiner

RF TAG

TECHNICAL FIELD

The present invention relates to an RF tag, and particularly has an object to provide an RF tag that can be mounted in a cavity of a member made of a conductor having the cavity therein, and has a high communication performance.

BACKGROUND ART

Recently, RFID (Radio Frequency Identification) has been used.

An antenna and an IC chip are housed in an RF tag to be used for an RFID system, and the RFID system is designed so that a carrier wave transmitted from an antenna of a reader/writer is received by the antenna of the RF tag, and identification data, etc. recorded in the IC chip are returned to the reader/writer while the identification data, etc. are carried on a reflection wave, thereby performing communication in a contactless manner.

It is cited as one of applications of RF tags that the RF tags are attached to various kinds of members to perform number management, disposal management, position management, etc. of the members.

For example, Patent Literature 1 discloses an article manufacturing system in which RF tags are attached to respective parts such as a display, a power supply and a battery in a computer manufacturing factory or the like, and the parts are assembled on each working stand while various kinds of information stored in the RF tags are read out.

Furthermore, Patent Literature 2 discloses a number management system in which an RF tag is attached to a portion of the surface of a package transport box.

CITATION LIST

Patent Literature

Patent Literature 1: Japanese Patent Laid-Open No. 2008-181557
Patent Literature 2: Japanese Patent Laid-Open No. 2003-226434

SUMMARY OF INVENTION

Technical Problem

However, the foregoing prior arts have problems as described below.

That is, all the techniques enhance reading accuracy by attaching an RF tag to the surface of a part or package transport box while the RF tag is exposed.

However, when the RF tag is exposed on the surface, another part, box or the like may collide with the RF tag under assembling or transportation, so that the RF tag may be damaged.

Also, as general problems of RF tags are known a problem that when an RF tag is approached to a conductor (metal object or the like), the resonance frequency is shifted to hinder communication, or a problem that it is impossible to perform communication when electric waves are irradiated to the back side surface of a surface onto which the RF tag is attached.

In view of the problems as described above, the present invention has an object to provide an RF tag that can be mounted in a cavity of a member made of a conductor having the cavity therein, and has a high communication performance.

Solution to Problem

An RF tag according to the present invention is an RF tag that can be mounted in a cavity of a conductor-made member having the cavity therein, and includes: at least a free space antenna; a resonance circuit; an IC chip; a closed space antenna; and a substrate for supporting the closed space antenna, wherein a portion of the free space antenna is exposed from the cavity to an outside, and the substrate supports the closed space antenna so that the closed space antenna is not in contact with an inner surface of the conductor-made member.

The free space antenna is a helical antenna.

When a wavelength of a reception electric wave is $\lambda$, an electrical length of the portion of the free space antenna which is exposed to the outside is equal to $\lambda/4$.

The RF tag further includes a cap for covering the exposed portion of the free space antenna to the outside, wherein the cap is made of a material that transmits electric waves therethrough.

The closed space antenna, the substrate, and the conductor-made member constitute a capacitor portion, and a resonance frequency is adjusted by adjusting a capacitance of the capacitor portion.

Advantageous Effects of Invention

In the present invention, since most of the RF tag is positioned in the cavity of the conductor-made member, it is possible to prevent the RF tag from being damaged by collision or the like.

Furthermore, in the RF tag of the present invention, the substrate supports the closed space antenna positioned in the cavity of the conductor-made member. At that time, the substrate supports the closed space antenna so that the closed space antenna is not in contact with the inner surface of the conductor-made member, and thus the capacitor portion is formed by the closed space antenna, the substrate, and the conductor-made member. As a result, the closed space antenna and the conductor-made member are electrically connected to each other, and the IC chip connected to the closed space antenna is electrically connected to the conductor-made member, whereby the entire conductor-made member can be used as an antenna. Since the carrier wave transmitted from the reader/writer can be received by the conductor-made member, a high communication performance can be obtained.

Furthermore, by changing the length of the closed space antenna, the capacitance of the capacitor portion can be adjusted, so that the resonance frequency can be adjusted.

Furthermore, the case where "the closed space antenna and the conductor-made member are electrically connected to each other" may include not only a case where they are connected to each other via the capacitor portion as described above, but also a case where the closed space antenna and the conductor-made member are brought into direct contact with each other. When the closed space antenna and the conductor-made member are brought into direct contact with each other, no capacitor portion is formed, so that it is difficult to adjust the resonance frequency and the communication performance deteriorates. However, the function as an RF tag can be performed.

Furthermore, when a helical antenna is used as the free space antenna, the helical antenna can surely perform communication by utilizing an omnidirectional feature because the helical antenna has both horizontal and vertical polarization components. By utilizing this feature, it is possible to enhance the reception/transmission sensitivity of the RF tag and also achieve stable communication even when the conductor-made member to which the RF tag is attached moves.

In the present invention, the term "conductor" is "a generic term for substances with a relatively high electric conductivity" (Kojien) like a general meaning, and for example, metal, carbon fiber, human body, animal body, vegetation, water, ground, and the like may be cited, but it is not necessarily limited to the above things.

Furthermore, when the portion of the free space antenna which is exposed to the outside is covered by the cap made of a material such as plastics that transmits electric waves therethrough, waterproof/dustproof performance of the RF tag can be enhanced.

DESCRIPTION OF EMBODIMENT

An embodiment of an RF tag of the present invention will be described with reference to the drawings.

Figure 1:
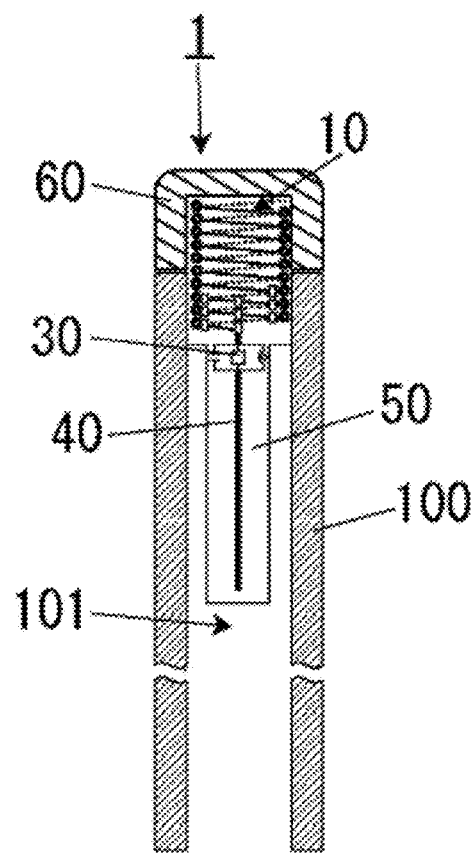
FIG. 1 is a diagram showing the inside of a conductor-made member with an RF tag attached thereto.
Figure 2:
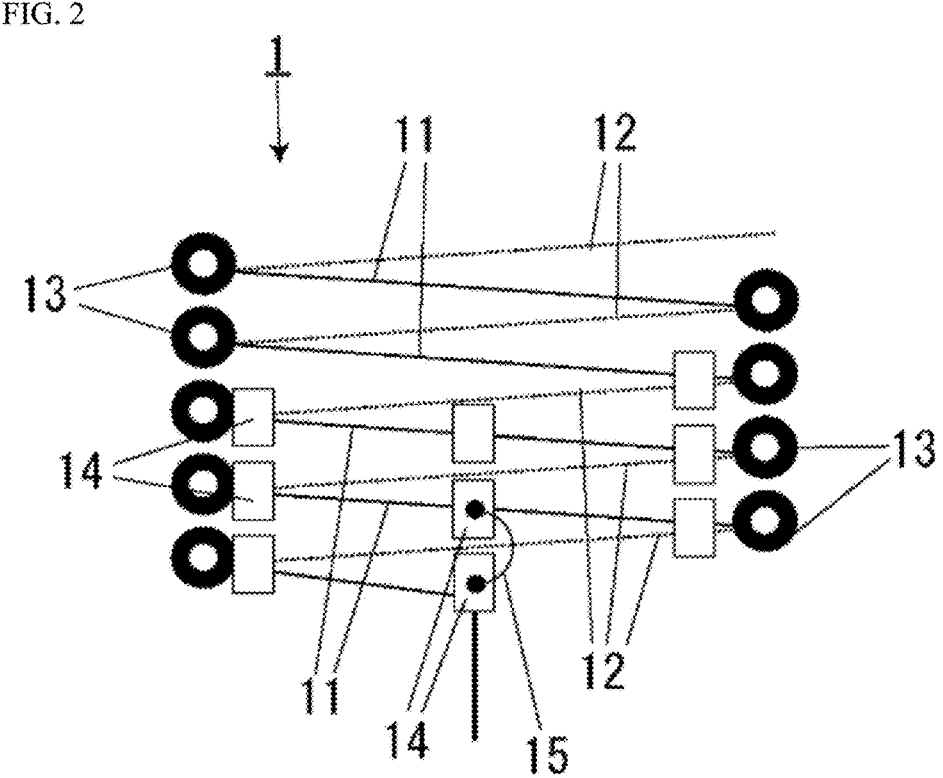
FIG. 2 is an enlarged view showing a structure of a free space antenna.
Figure 3:
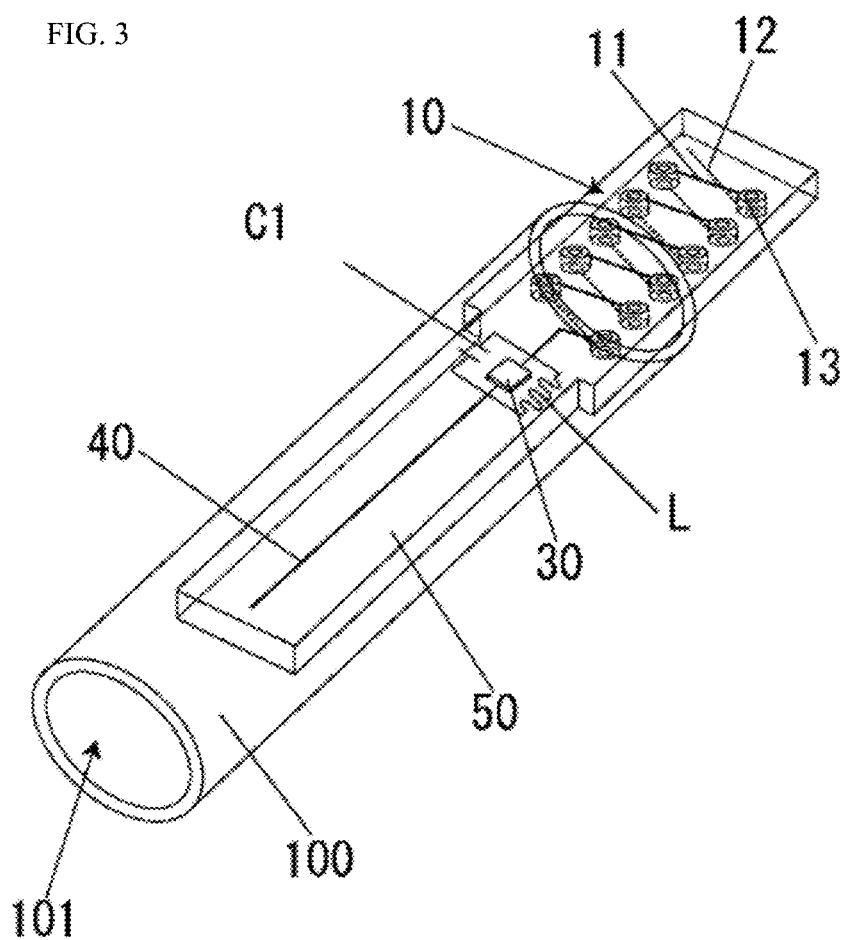
FIG. 3 is a perspective view showing the conductor-made member with an RF tag attached thereto.

As shown in FIGS. 1 to 3, an RF tag 1 is mounted in a cavity 101 of a conductor-made member 100 having the cavity 101 therein to perform various managements such as identification of the conductor-made member 100.

In the present embodiment, it is assumed that a pipe made of metal is used as the conductor-made member 100 having the cavity 101 therein. The conductor-made member 100 may be a member having a cavity 101 therein, and the cross-sectional shape on a plane orthogonal to a longitudinal direction is not limited to a circle, but may be a polygon.

The RF tag 1 is generally configured by a free space antenna 10, a resonance circuit 20, an IC chip 30, a closed space antenna 40, a substrate 50 and a cap 60. In FIG. 3, the cap 60 is omitted from the illustration.

The free space antenna 10 is generally configured by first conductors 11 and second conductors 12.

Two arrays of multiple through-holes 13 are provided along a front-and-rear direction on right and left sides on the substrate 50 to be spaced from each other at a regular interval.

The first conductors connect the right and left through-holes 13 on the front surface side of the substrate 50 while inclined with respect to the right-and-left direction of the substrate 50.

The second conductors connect the right and left through-holes 13 on the back surface side of the substrate 50 while inclined with respect to the right-and-left direction of the substrate 50.

A coil having a predetermined length is configured as a whole by electrically connecting the first conductors 11 and the second conductors 12 via the through-holes 13.

Lands 14 are provided in the vicinity of the through-holes 13 provided on the rear side of the substrate 50. The lands 14 are electrically connected to one another to be set as a jumper wire 15, which enables fine adjustment of the resonance frequency of the free space antenna 10.

A portion of the free space antenna 10 is exposed to the outside from the cavity 101 of the conductor-made member 100, and the electrical length of the exposed portion is equal to one fourth of a use frequency λ.

A helical antenna or a bar antenna may be also used as the free space antenna 10.

The resonance circuit 20 and the IC chip 30 are formed on the surface of the substrate 50.

Figure 4:
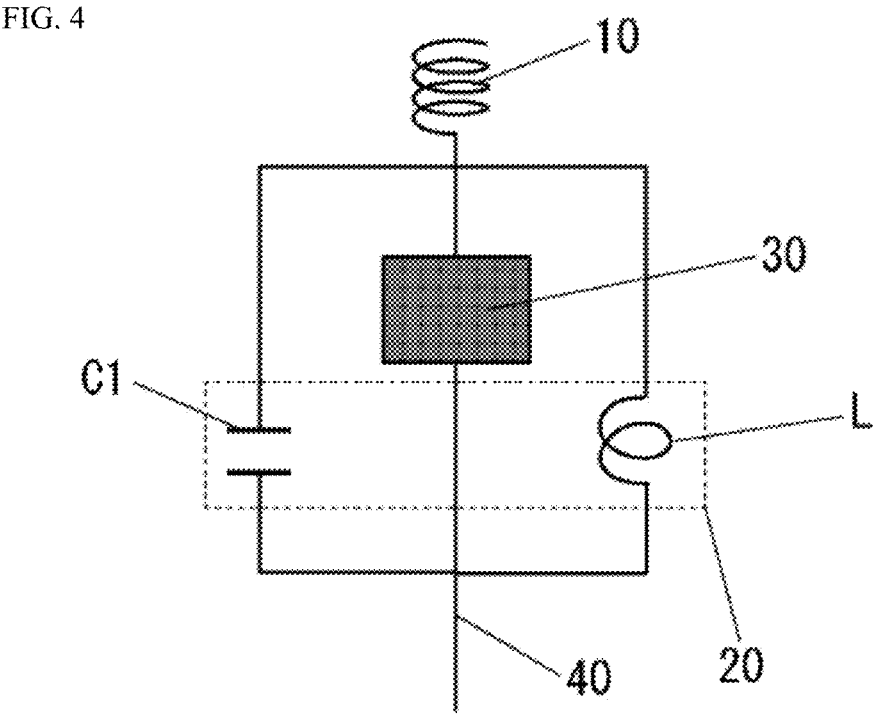
FIG. 4 is an equivalent circuit diagram of the RF tag.

FIG. 4 is an equivalent circuit diagram of the RF tag 1 of the present embodiment. Reference sign L represents a coil, and constitutes the resonance circuit 20 with a first capacitor C1. It is to be noted that the resonance circuit 20 may be constituted by using a capacitor in the IC chip 30 without providing the first capacitor C1.

The IC chip 30 rectifies a part of a carrier wave W (see FIG. 5) transmitted from a reader/writer to generate a power supply voltage which is necessary for the IC chip 30 to operate. Then, a memory in which a logic circuit for control, etc. are stored, a communication circuit for transmitting/receiving data to/from the reader/writer, and the like in the IC chip 30 are operated with the generated power supply voltage. It is to be noted that an external power supply may be input to the IC chip 30 to operate the IC chip 30.

The closed space antenna 40 extends in the front-and-rear direction on the substrate 50 while one end portion thereof is connected to the IC chip 30.

The substrate 50 supports the closed space antenna 40 so that the closed space antenna 40 is not in contact with the inner surface of the conductor-made member 100.

Figure 5:
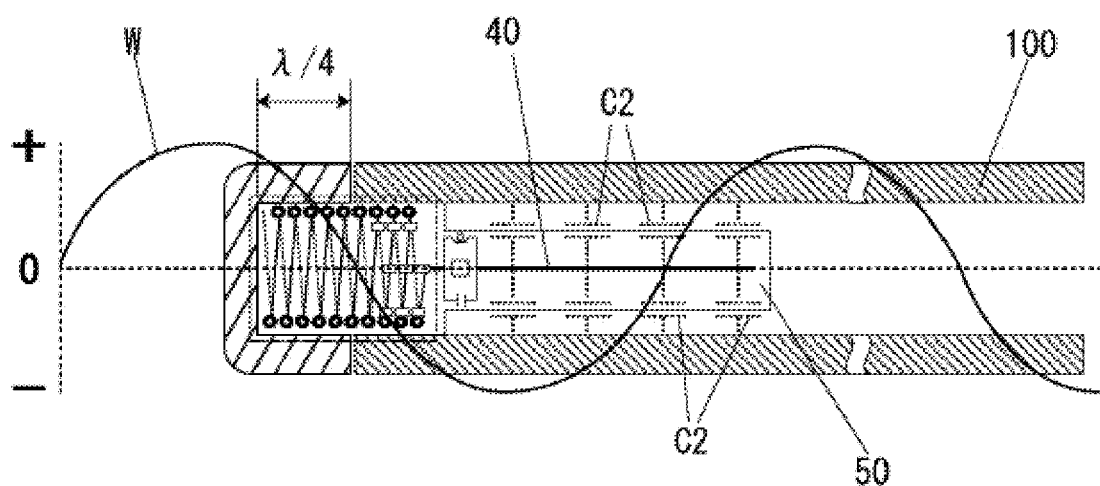
FIG. 5 is a diagram schematically showing a reception state of electric waves and a capacitor portion.

As shown in FIG. 5, the closed space antenna 40, the substrate 50, and the conductor-made member 100 constitute a second capacitor C2. As a result, the closed space antenna 40 and the conductor-made member 100 are electrically connected to each other, so that the entire conductor-made member 100 can be used as an antenna. Furthermore, the capacitance of the second capacitor C2 can be adjusted by changing the length of the closed space antenna 40, whereby the resonance frequency can be adjusted.

It is to be noted that the closed space antenna 40 may be configured in a meandering shape or a coil-like shape in addition to a rod-like shape.

Figure 6:
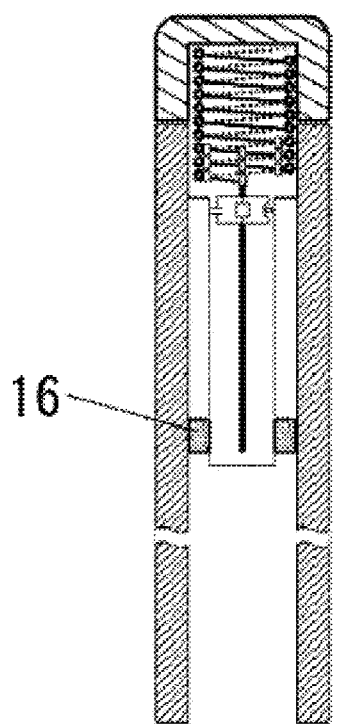
FIG. 6 is a diagram showing another configuration example of the RF tag.

Furthermore, as shown in FIG. 6, a spacer 16 may be interposed between the substrate 50 and the inner surface of the conductor-made member 100 so as to prevent the closed space antenna 40 from being in contact with the inner surface of the conductor-made member 100.

The cap 60 is a member for covering a portion of the free space antenna 10 which is exposed to the outside, and is made of a material for transmitting electric waves therethrough. By using the cap 60, the RF tag 1 can obtain waterproof/dustproof performance.

In the present embodiment, the RF tag 1 itself is fixed to the conductor-made member 100 by fixing the substrate 50 to the inside of the cap 60 and fixing the cap 60 to the conductor-made member 100. It is to be noted that the RF tag 1 itself may be fixed to the conductor-made member 100 by fixing the side surface of the free space substrate 50 to the inner surface of the conductor-made member 100.

INDUSTRIAL APPLICABILITY

The present invention relates to an RF tag that can be mounted in a cavity of a member made of a conductor having the cavity therein and has a high communication performance, and has an industrial applicability.

REFERENCE SIGNS LIST

C1 first capacitor
C2 second capacitor
L coil
W carrier wave
1 RF tag
10 free space antenna
11 first conductor
12 second conductor
13 through-hole
14 land
15 jumper wire
16 spacer
20 resonance circuit
30 IC chip
40 closed space antenna
50 substrate
60 cap
101 cavity
100 conductor-made member

What is claimed is:

1. An RF tag that can be mounted in a cavity of a conductor-made member having the cavity therein including: at least a free space antenna; a resonance circuit; an IC chip; a closed space antenna; and a substrate for supporting the closed space antenna, wherein a part of the free space antenna is exposed from the cavity to an outside, and the substrate supports the closed space antenna so that the closed space antenna is not in contact with an inner surface of the conductor-made member.

2. The RF tag according to claim 1, wherein the free space antenna is a helical antenna.

3. The RF tag according to claim 1, wherein when a wavelength of a reception electric wave is $\lambda$, an electrical length of a portion of the free space antenna which is exposed to the outside is equal to $\lambda/4$.

4. The RF tag according to claim 1, further including a cap for covering the exposed portion of the free space antenna to the outside, wherein the cap is made of a material that transmits electric waves therethrough.

5. The RF tag according to claim 1, wherein the closed space antenna, the substrate, and the conductor-made member constitute a capacitor portion, and a resonance frequency is adjusted by adjusting a capacitance of the capacitor portion.

* * * * *